Figure 1:
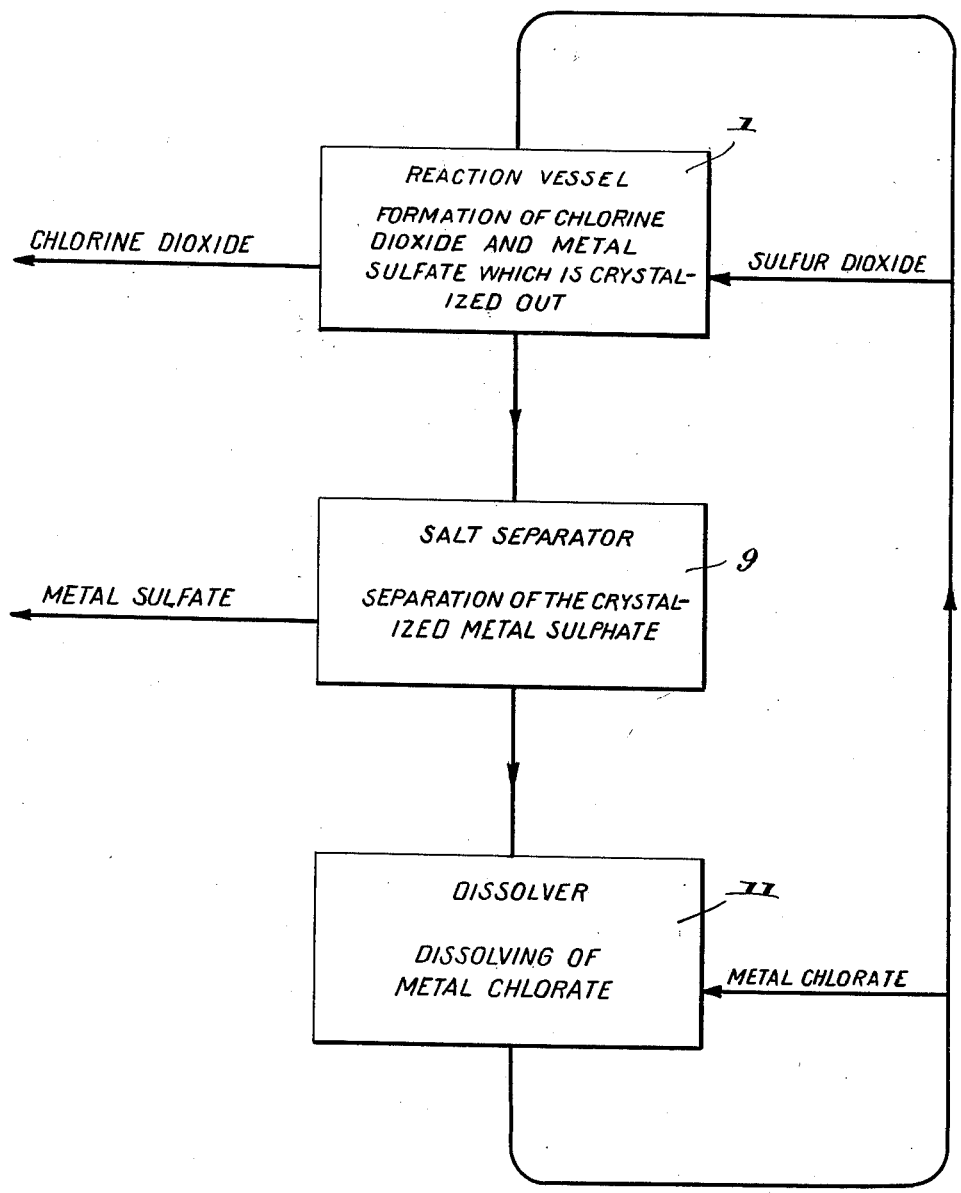

Dec. 2, 1952        S. U. EKMAN        2,620,260

METHODS OF MAKING CHLORINE DIOXIDE

Filed Jan. 8, 1948        2 SHEETS—SHEET 1

INVENTOR.
Sven Ulf Ekman
BY
Young, Emery + Thompson
ATTYS.

Patented Dec. 2, 1952

2,620,260

UNITED STATES PATENT OFFICE 2,620,260

METHODS OF MAKING CHLORINE DIOXIDE

Sven Ulf Ekman, Ornskoldsvik, Sweden, assignor to Mo Och Domsjo Aktiebolag, Ornskoldsvik, Sweden, a corporation of Sweden Application January 8, 1948, Serial No. 1,206
In Sweden January 14, 1947

2 Claims.  (Cl. 23—152)

The present invention relates to an ipmroved method of producing chlorine dioxide. More particularly the invention has for its object to improve the process in which chlorine dioxide is formed by causing sulfur dioxide or sulfur dioxide containing gases to react with an acid solution of a chlorate.

The chemical reaction which takes place between the sulfur dioxide and the chlorate in this process may summarily be represented by the following formula in which Me symbolizes a metal atom—in this particular case a univalent metal atom:

$$2MeClO_3 + SO_2 \rightarrow 2ClO_2 + Me_2SO_4$$

Thus, the sulfur dioxide has a reducing action upon the chlorate with the formation of chlorine dioxide and metal sulfate.

In practice certain undesirable side-reactions also occur in which the chlorate is reduced as far as to chlorine or chloride, for instance according to the following formula:

$$2MeClO_3 + 5SO_2 + 4H_2O \rightarrow Cl_2 + Me_2SO_4 + 4H_2SO_4$$

These side-reactions reduce the yield of chlorine dioxide and are responsible for a highly increased consumption of sulfur dioxide. Simultaneously the gaseous chlorine dioxide formed will be contaminated with chlorine. It is therefore of great importance to restrain the side-reactions as much as possible.

The extent of these side-reactions depends upon certain factors at the reaction between the chlorate and the sulfur dioxide. Amongst these factors are the chlorate concentration, the acidity and the temperature of the reaction solution, the amount of reacting gas mixture per unit of time, the sulfur dioxide content of said mixture and the manner of introducing the same into the reaction solution.

The present invention is based upon the known observation that the chlorine dioxide yield as well as the rate of formation of the same increases with increasing concentration of metal chlorate in the reaction solution.

In methods hitherto known said reaction has been carried out by causing a more or less concentrated and acidified metal chlorate solution to react with sulfur dioxide gas, preferably diluted with inert gases, until the metal chlorate is wholly or for the greater part consumed. In order to take care of and to utilize as far as possible the chemicals present, the metal sulfate formed has sometimes been removed from the system by cooling the reaction solution to a suitable temperature—with or without a preceding evaporation—the greater part of the metal sulfate being thus caused to crystallize out and separated. To the acid solution thus freed from the main portion of the metal sulfate more chlorate has been added whereupon the solution has been used for a new reaction.

As an example of a previously used method for making chlorine dioxide the method described in the FIAT Final Report No. 825, published by H. M. Stationary Office, London, may be mentioned. According to this method sodium chlorate of an initial concentration of nearly 500 g./l. in a 7–8 normal sulfuric acid solution is caused to react with a mixture of sulfur dioxide and air until all of the chlorate has been consumed. At this reaction the temperature must be kept as high as at 45–50° C. in order to prevent the sodium sulfate from crystallizing out at the end of the reaction thereby causing disturbances in the operation of the plant.

In the known methods above described the chlorate concentration falls during the reaction and assumes a very low value at the end of the same. This results in a chlorine dioxide yield, which falls as the reaction proceeds, and in a decreasing rate of formation of chlorine dioxide, i. e. the result will be a low capacity of the plant. The best results are obtained if the initial concentration of the reaction solution is kept as high as possible, and if the reaction is interrupted when the chlorate concentration has attained a value which is sufficiently low to permit the metal sulfate to be removed from the system in the manner above described without chlorate losses being suffered.

According to another method of making chlorine dioxide described by Dr. Ing. Johan Sevón in an article dealing with the technical production of chlorine dioxide and appearing in the Finnish periodical "Kemian Keskusliiton Julkaisuja," 10, No. 7, 1945, liquid is used in the reaction mix to such extent only that the chlorine dioxide formation is made possible, the reaction mix remaining solid, or at most pasty, during the whole process. In this way the chlorate concentration may be kept high during practically the whole reaction. The solid, or pasty, reaction mix must be vigorously agitated during the reaction, however, in order to secure a good contact with the gaseous phase. This puts severe demands upon the material of the reaction vessel which are very difficult to satisfy in practice.

The present invention relates to a process of making chlorine dioxide by causing an acid solution of a chlorate, such as sodium chlorate, to react with sulfur dioxide or sulfur dioxide containing gases in a suitable reaction vessel, the chlorate solution being substantially saturated with the sulfate of the cation of said chlorate so that sulfate will crystallize out of itself as it is formed during the reaction between the sulfur dioxide and the chlorate, further quantities of which are added to and dissolved in the reaction solution according as the chlorate therein is consumed at the reaction with the sulfur dioxide so that the chlorate concentration of the solution is maintained and a high yield and a high rate of formation of chlorine dioxide is secured. Preferably the reaction is carried out under such conditions that the crystallized sulfate forms the only solid phase in the reaction vessel.

Thus according to the invention the reaction solution should always be saturated in respect to the sulfate. Depending upon the conditions in the reaction solution the sulfate will then crystallize out as it is formed either as neutral or acid sulfate and with or without crystal water. The crystals are removed from the system in a suitable manner, such as by sedimentation, filtration or centrifugation. According as the chlorate is consumed during the reaction, further amounts of chlorate are added to the reaction solution. In this way the chlorate concentration is kept at a high and rather constant level during the process.

Since, as stated above, the sulfate is caused to crystallize out of itself it is possible to maintain a high chlorate concentration during the whole reaction. This results in a higher chlorine dioxide yield and a more rapid chlorine dioxide formation than has been possible with the previously known methods. This improved yield further results therein that the chlorine dioxide will be less contaminated with chlorine.

Thus the invention provides for a very simple and economical method for continuously producing chlorine dioxide.

Figure 2:
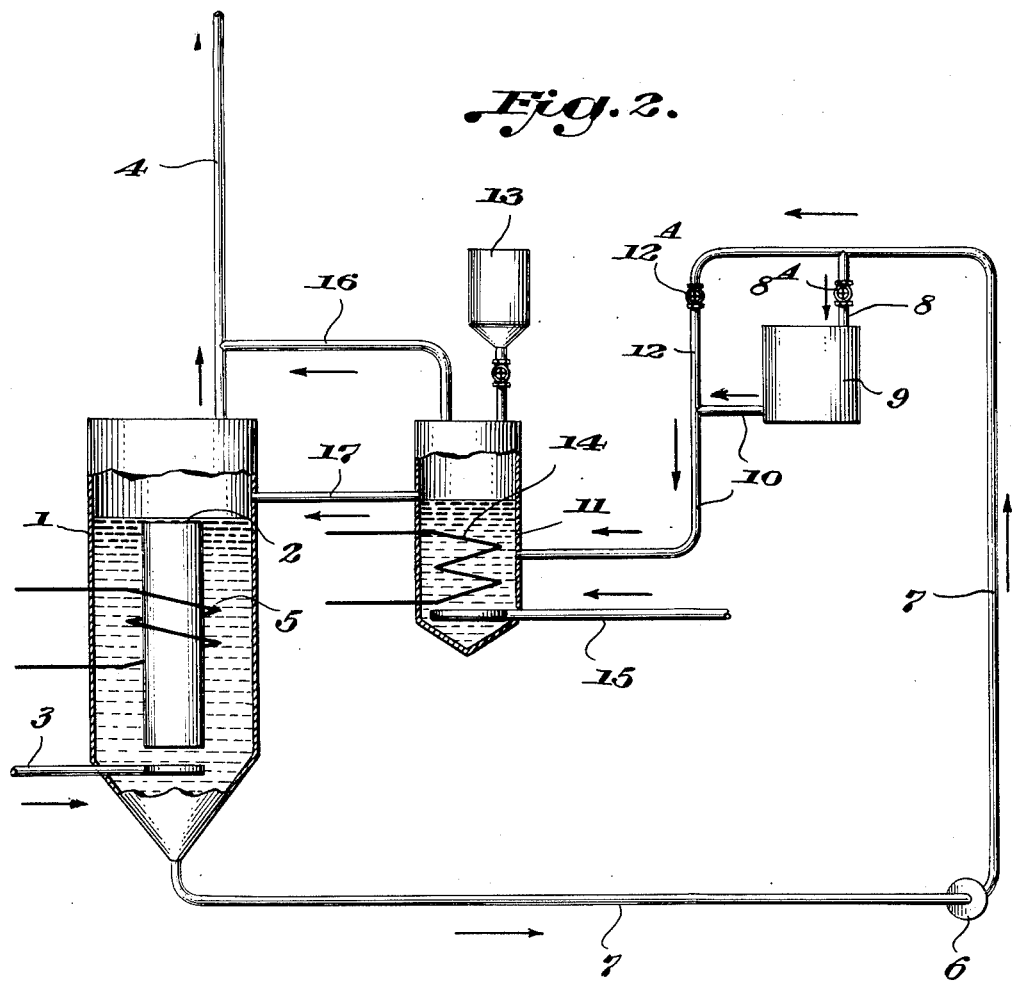

A preferred embodiment of the new process will be described in the following with reference to the accompanying drawings, wherein:

Fig. 1 is a diagram of the process, and
Fig. 2 shows a suitable plant for carrying out the process.

During the process the reaction solution circulates continuously through a reaction vessel 1, a salt separator 9 and a dissolver 11 in the sequence stated. Sulfur dioxide, preferably diluted with some inert gas, such as air or nitrogen, is introduced into the reaction solution in the reaction vessel. The reaction solution preferably comprises a highly concentrated solution of a metal chlorate, such as sodium chlorate, acidified by means of a strong acid, e. g. sulfuric acid. The solution is saturated in respect to metal sulfate which during the reaction between the sulfur dioxide and the metal chlorate crystallizes out according as it is formed. The chlorine dioxide formed leaves the reaction vessel together with the inert gases. In the salt separator the metal sulfate crystals are removed from the system, for instance by sedimentation, filtration or centrifugation. In the dissolver an amount of chlorate equal to that consumed in the reaction vessel is added and dissolved. The dissolver may be provided with a heating means through which the temperature can be kept somewhat higher than in the reaction vessel in order to prevent metal sulfate from crystallizing out in the dissolver. From the dissolver the reaction solution is returned to the reaction vessel which is provided with a cooling means for cooling the entering solution to the reaction temperature and for drawing off the heat developed at the reaction.

In the embodiment of the apparatus shown in Fig. 2 the reaction vessel 1 has a capacity of about 1100 litres. The reaction solution therein contains 3 mol/litre of sodium chlorate, 4 mol/litre of sulfuric acid and furthermore sodium sulfate in an amount sufficient to saturate the solution at the reaction temperature which is assumed to be 30° C. In the reaction vessel 1 there is arranged a vertical circulation tube 2 the height of which amounts to 4.5 m. whereas the inner diameter thereof is 225 mm. This tube is open at both ends, and the reaction solution is filled up substantially on a level with the upper end of the tube. Through a pipe 3 which terminates in a perforated coil immediately below the circulation tube 2 combustion gases from an iron-pyrites oven containing 8–10% of sulfur dioxide are introduced in an amount corresponding to 4.5–5 kg. of sulfur dioxide per hour. The gas bubbles rise through the circulation tube 2 and cause a vigorous circulation of the liquid upwards through this tube and downwards outside the same. The chlorine dioxide formed escapes through a pipe 4 together with the indifferent gases from the iron-pyrites oven. The sulfur dioxide is quantitatively absorbed by the reaction solution. The reaction temperature is kept at 30° C. by means of a cooling coil 5. The sodium sulfate formed at reaction crystallizes out spontaneously mainly in the form of

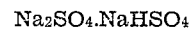

$$Na_2SO_4 \cdot NaHSO_4$$

These crystals are carried along with the reaction solution which is forced through pipes 7 and 8 to a centrifuge 9 by a pump 6. In the centrifuge 9 the crystals are separated and taken out, if desired after washing. From the centrifuge 9 the reaction solution flows through a pipe 10 to the dissolver 11. While the centrifuge 9 is being emptied of crystals the reaction solution by manipulation of the valves 8A and 12A may be by-passed the centrifuge 9 through a pipe 12. It is thus kept constantly in circulation so that the crystals are prevented from obstructing the pipes. In the dissolver 11 sodium chlorate is added through a hopper 13 according as the chlorate is consumed in the reaction vessel 1. The temperature in the dissolver is kept at 40–50° C. by means of a heating coil 14. Air is introduced into the dissolver 11 at the bottom thereof through a perforate coil 15 in order to agitate the solution. The air together with a small amount of chlorine dioxide escapes through the pipes 16 and 4. From the dissolver 11 the reaction solution flows back to the reaction vessel 1 through the pipe 17.

The yield of chlorine dioxide based on consumed sodium chlorate amounts to 95%.

The amount of active chlorine produced is 500 kg. in 24 hours.

In the above description sodium chlorate is mentioned as an example of a chlorate. However, the invention is in no way limited to the use of this chlorate as the cations do not participate in the chlorine dioxide formation. Examples of other chlorates which may be used are potassium, ammonium, calcium and magnesium chlorates. As a general rule every chlorate may be used which can be dissolved in water to form a solution of a concentration of at least 1 mol/litre at room temperature (about 10-50° C.).

In order to obtain a high yield of chlorine dioxide from the very beginning one may start with a solution which has been acidified beforehand. For the acidification any other strong acid may be used instead of sulfuric acid, such as phosphoric acids. It is also within the scope of this invention to start with a neutral chlorate solution which under chlorine dioxide formation through side-reactions in a known manner assumes a sufficient degree of acidity.

The acidity of the reaction solution should preferably be kept at a value higher than 2 N, for instance at 6-7 N or even higher, as at 10 N.

As regards the temperature of the reaction system this has an upper limit defined by explosivity of the chlorine dioxide and a lower limit such as to obtain a sufficient velocity of reaction. Usually temperatures between 20° C. and 40° C. are suitable.

What I claim is:

1. The process of generating chlorine dioxide which comprises reacting sulfur dioxide with an acid solution of a chlorate, said solution being substantially saturated with the sulfate of the cation of said chlorate at the reaction temperature, whereby sulfate formed during the reaction will crystallize out spontaneously, circulating the reaction solution with unreacted chlorate having a chlorate concentration of the order of 3 mols per litre from a vessel in which the reaction between the sulfur dioxide and the chlorate takes place and back to said vessel through a crystal separator for removing the sulfate crystals formed, and adding chlorate to the cycle in an amount substantially equivalent to that consumed in the reaction vessel to constantly maintain the chlorate concentration at a high value and secure a high yield and a high rate of formation of chlorine dioxide.

2. The process of generating chlorine dioxide which comprises reacting sulfur dioxide with an acid solution of a chlorate, said solution being substantially saturated with the sulfate of the cation of said chlorate at the reaction temperature, whereby sulfate formed during the reaction will crystallize out spontaneously, circulating the reaction solution with unreacted chlorate having a chlorate concentration of the order of 3 mols per litre from a vessel in which the reaction between the sulfur dioxide and the chlorate takes place and back to said vessel through a crystal separator for removing the sulfate crystals formed and through a dissolver wherein chlorate is added and dissolved in an amount substantially equivalent to that consumed in the reaction vessel so as to constantly maintain the chlorate concentration at a high value and secure a high yield and a high rate of formation of chlorine dioxide.

SVEN ULF EKMAN.

REFERENCES CITED

The following references are of record in the file of this patent:

UNITED STATES PATENTS

| Number | Name | Date |
|---|---|---|
| 2,317,443 | Cunningham | Apr. 27, 1943 |
| 2,373,830 | Holst | Apr. 17, 1945 |
| 2,481,240 | Rapson et al. | Sept. 6, 1949 |

FOREIGN PATENTS

| Number | Country | Date |
|---|---|---|
| 537,557 | Great Britain | June 26, 1941 |
| 577,054 | Great Britain | May 2, 1946 |
| 581,931 | Great Britain | Oct. 30, 1946 |